(Model.)
J. NEFF.
CORN PLANTER.
No. 266,500. Patented Oct. 24, 1882.
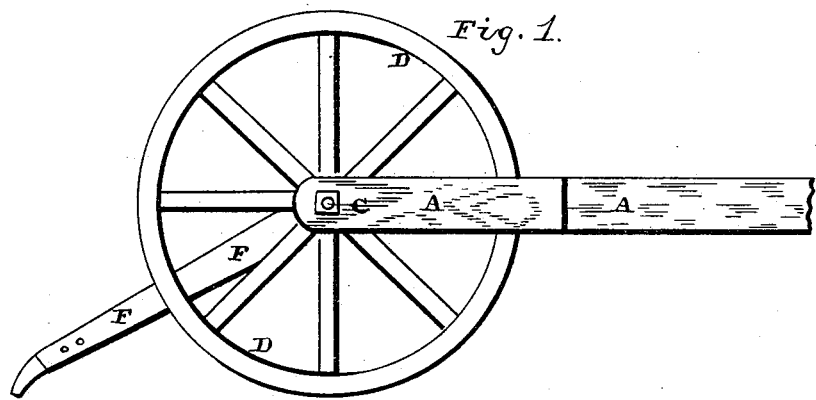
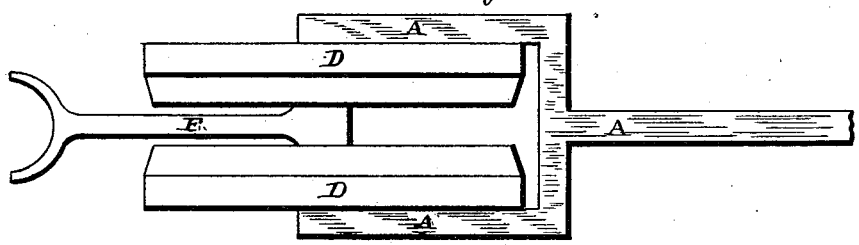
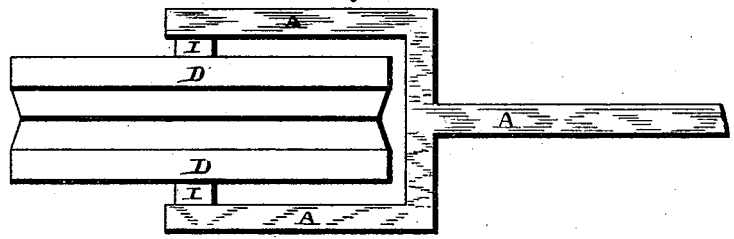

UNITED STATES PATENT OFFICE.

JESSE NEFF, OF AVENUE, OHIO.

CORN-PLANTER.

SPECIFICATION forming part of Letters Patent No. 266,500, dated October 24, 1882.

Application filed July 14, 1882. (Model.)

*To all whom it may concern:*

Be it known that I, JESSE NEFF, of Avenue, in the county of Franklin and State of Ohio, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in corn-planters; and it consists in the combination of two wheels beveled on their inner edges, a frame in which they are held, and a drag which is drawn along behind for the purpose of assisting in covering the grain, all of which will be more fully described hereinafter.

The object of my invention is to provide an attachment to corn-planters which will cover the corn as fast as dropped, and which can be drawn along behind the machine without adding anything material to the weight of the machine.

Figure 1 is a side elevation of my invention. Fig. 2 is a plan view of the same. Fig. 3 is a plan view of the wheels placed together so as to form a single wheel.

A represents the frame, which may either be of the shape here shown or any other that may be preferred, and which is to be fastened on behind double corn-planters of any kind. Passing through the rear end of this frame is the journal C, upon which the two wheels D are placed. The inner edges of both of these wheels are beveled, as shown, so as to force the earth toward the grain, and thus cover it up as fast as dropped. In between the hubs of these two wheels are placed the covering device F, which consists of a rod which has its rear end pronged, so as to brush away the clods and to cover over the grain in case the wheels do not cover them thoroughly enough. These two devices are to be used together where the ground is hard, and each one acts as a help to the other. Where the ground is mellow the covering device F may be removed entirely and the two wheels then be moved close together, as shown, so that the two beveled edges will then come together and form a solid wheel. In order to keep these two wheels pressed together, a washer, I, is passed over each end of the journal outside of the hubs of the wheels, and thus all the space that was occupied by the covering device is taken up, and the wheels are thus prevented from moving laterally on the journal. The two beveled edges serve to force the earth toward the grains, and to cover them up without displacing them in the least. This attachment is very light, and will add nothing perceptible to the weight of the machine.

I claim—

1. The combination of the frame, the two wheels beveled on their inner edges, and the covering device which is pivoted between the two wheels, substantially as shown.

2. The combination of the frame A, which is adapted to be attached to a corn-planter, the axle C, the wheels D, beveled on their inner edges and made adjustable back and forth on the axle, and the washers I, for holding the wheels together when used for covering, substantially as shown and described.

In testimony whereof I affix my signature in presence of two witnesses.

JESSE NEFF.

Witnesses:
J. F. HOFFMAN,
J. S. GOLD.